(12) United States Patent
Ogihara

(10) Patent No.: US 12,485,602 B2
(45) Date of Patent: Dec. 2, 2025

(54) METHOD FOR MANUFACTURING RESIN CONTAINER AND RESIN CONTAINER MANUFACTURING APPARATUS

(71) Applicant: NISSEI ASB MACHINE CO., LTD., Nagano (JP)

(72) Inventor: Manabu Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 168 days.

(21) Appl. No.: 18/037,147

(22) PCT Filed: Nov. 18, 2021

(86) PCT No.: PCT/JP2021/042437
§ 371 (c)(1),
(2) Date: Aug. 16, 2023

(87) PCT Pub. No.: WO2022/107851
PCT Pub. Date: May 27, 2022

(65) Prior Publication Data
US 2024/0123672 A1    Apr. 18, 2024

(30) Foreign Application Priority Data
Nov. 18, 2020 (JP) .................................. 2020-191583

(51) Int. Cl.
*B29C 49/64*    (2006.01)
*B29C 49/06*    (2006.01)
(Continued)

(52) U.S. Cl.
CPC ............ *B29C 49/643* (2022.05); *B29C 49/06* (2013.01); *B29C 49/6445* (2013.01); *B29C 45/2701* (2013.01); *B29L 2031/712* (2013.01)

(58) Field of Classification Search
CPC . B29C 49/062; B29C 49/6445; B29C 49/643; B29C 49/786; B29C 49/06;
(Continued)

(56) References Cited

U.S. PATENT DOCUMENTS 10,953,588 B2    3/2021 Aoki
11,260,575 B2    3/2022 Kawamura et al.
(Continued)

FOREIGN PATENT DOCUMENTS

JP        57-103821 A      6/1982
JP        5-185493 A       7/1993
(Continued)

OTHER PUBLICATIONS

Supplementary European Search Report dated Aug. 30, 2024 in European family member application No. 21894723.2.
(Continued)

*Primary Examiner* — Monica A Huson
(74) *Attorney, Agent, or Firm* — GREENBLUM AND BERNSTEIN, P.L.C.

(57) ABSTRACT

A method for manufacturing a resin container includes: performing injection molding on a resin preform; adjusting a temperature of the preform manufactured in the performing injection molding; and performing blow molding on the temperature-adjusted preform to manufacture the resin container. In the performing injection molding, injection molds are opened after completion of filling and pressure holding of a resin material, and the preform is taken out without being cooled in the injection molds after the completion of filling and pressure holding. In addition, in the adjusting the temperature, a refrigerant is introduced into the preform to cool the preform.

4 Claims, 7 Drawing Sheets

(51) Int. Cl.
B29C 45/27 (2006.01)
B29L 31/00 (2006.01)

(58) Field of Classification Search
CPC ........ B29C 2949/28; B29C 2949/0771; B29C 2949/3032; B29C 2049/7882; B29C 49/6467; B29C 2049/023; B29C 2949/0781; B29C 49/071; B29C 45/2701; B29C 2049/7862; B29C 2949/22; B29C 2949/26; B29C 2949/24; B29C 49/6427; B29L 2031/712; B29L 2031/7158
See application file for complete search history.

(56) References Cited

U.S. PATENT DOCUMENTS

| 2002/0074687 | A1 | 6/2002 | Neter et al. | |
|---|---|---|---|---|
| 2019/0337218 | A1* | 11/2019 | Kawamura | B29C 49/48 |
| 2022/0009145 | A1 | 1/2022 | Tsuchiya | |
| 2022/0097284 | A1 | 3/2022 | Ogihara et al. | |
| 2022/0161481 | A1 | 5/2022 | Horiuchi et al. | |
| 2023/0302714 | A1 | 9/2023 | Horiuchi et al. | |

FOREIGN PATENT DOCUMENTS

| JP | 2008-073936 A | 4/2008 |
|---|---|---|
| WO | 2017/098673 A1 | 6/2017 |
| WO | 2019/078358 A1 | 4/2019 |
| WO | 2020/158917 A1 | 8/2020 |
| WO | 2020/158918 A1 | 8/2020 |
| WO | 2020/189723 A1 | 9/2020 |

OTHER PUBLICATIONS

International Search Report issued in International Bureau of WIPO Patent Application No. PCT/JP2021/042437, dated Dec. 28, 2021, along with an English translation thereof.

Written Opinion issued in International Bureau of WIPO Patent Application No. PCT/JP2021/042437, dated Dec. 28, 2021, along with an English translation thereof.

* cited by examiner

METHOD FOR MANUFACTURING RESIN CONTAINER AND RESIN CONTAINER MANUFACTURING APPARATUS

BACKGROUND OF THE INVENTION

Field of the Invention

The present invention relates to a method for manufacturing a resin container and a resin container manufacturing apparatus.

Description of the Related Art

Conventionally, a hot parison blow molding method is known as a method for manufacturing a resin container. The hot parison blow molding method is a method for blow-molding a resin container using residual heat from injection molding of a preform, and the method is advantageous in that various types of resin containers having a good external appearance can be manufactured, as compared with a cold parison blow molding method.

Regarding the hot parison blow molding method, various proposals focusing on shortening of a molding cycle have been made. In order to shorten the molding cycle, it is important to shorten an injection molding time of a preform (a cooling time of the preform) which is a rate-determining phase, as in WO 2017/098673 and JP H5-185493 A, for example.

In general, one cycle in an injection molding step of a preform includes steps of performing measurement, filling, pressure holding, and cooling. In a cooling time in the above-described injection molding step, since the preform is cooled in injection molds without pressure holding, shrinkage of the preform is promoted during cooling, and the preform is likely to have sink marks. As a countermeasure thereof, the sink marks of the preform can be reduced by lengthening a filling and pressure holding time, but the lengthening of the time may not lead to shortening of an injection molding time. In addition, in the hot parison blow molding method, the time of the injection molding step is usually a rate-determining phase, and the time of the molding cycle of a blow molding machine is set.

SUMMARY OF THE INVENTION

According to an aspect of the present invention, there is provided a method for manufacturing a resin container including: performing injection molding on a resin preform; adjusting a temperature of the preform manufactured in the performing injection molding; and performing blow molding on the temperature-adjusted preform to manufacture the resin container. In the performing injection molding, injection molds are opened after completion of filling and pressure holding of a resin material, and the preform is taken out without being cooled in the injection molds after the completion of filling and pressure holding. In addition, in the adjusting the temperature, a refrigerant is introduced into the preform to cool the preform.

Further features of the present invention will become apparent from the following description of exemplary embodiments with reference to the attached drawings.

DESCRIPTION OF THE EMBODIMENTS

Figure 1:
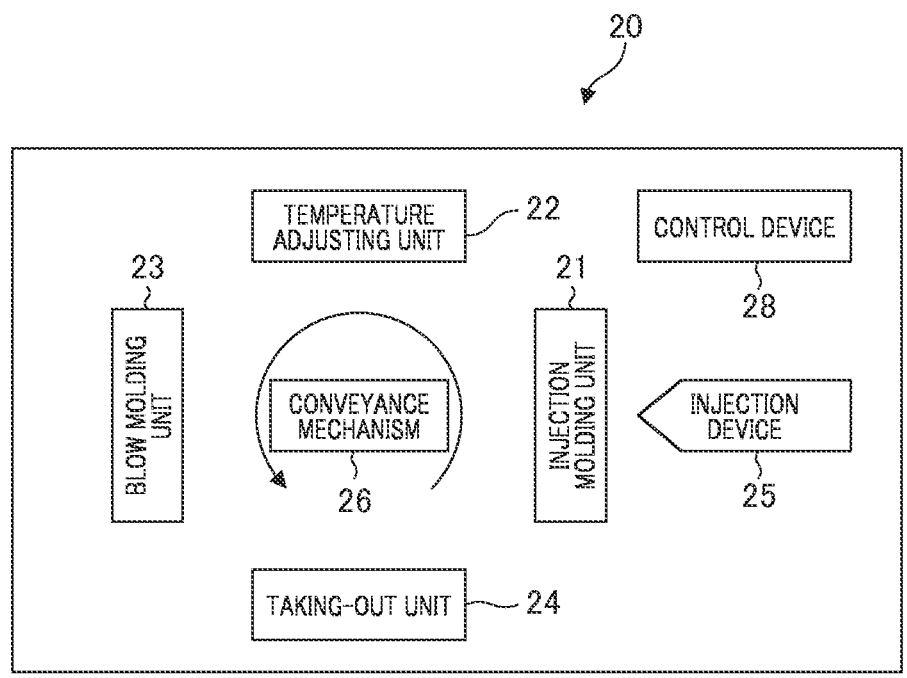
FIG. 1 is a diagram schematically illustrating a configuration of a blow molding apparatus according to an embodiment.

Hereinafter, embodiments of the present invention will be described with reference to the drawings.

In the embodiments, for easy understanding, structures and elements other than a main part of the present invention will be described in a simplified manner or omitted. In addition, in the drawings, the same reference numerals are assigned to the same elements. Further, the shapes, dimensions, and the like of the respective elements illustrated in the drawings are schematically illustrated and do not represent actual shapes, dimensions, and the like.

<Description of Blow Molding Apparatus>

First, a blow molding apparatus 20 for manufacturing a container will be described with reference to FIG. 1. FIG. 1 is a block diagram schematically illustrating a configuration of the blow molding apparatus 20. The blow molding apparatus 20 according to the embodiment is a hot parison type (also referred to as a one-stage type) apparatus that performs blow molding by utilizing residual heat (an internal heat quantity) from injection molding without cooling a preform 10 to room temperature.

The blow molding apparatus 20 includes an injection molding unit 21, a temperature adjusting unit 22, a blow molding unit 23, a taking-out unit 24, a conveyance mechanism 26, and a control device 28. The injection molding unit 21, the temperature adjusting unit 22, the blow molding unit 23, and the taking-out unit 24 are disposed at respective positions rotated by a predetermined angle (for example, 90 degrees) around the conveyance mechanism 26.

(Conveyance Mechanism 26)

The conveyance mechanism 26 includes a transfer plate (not illustrated) that moves to rotate about an axis in a direction perpendicular to the paper surface of FIG. 1. In the transfer plate, one or more neck molds 27 (not illustrated in FIG. 1) that hold a neck portion of the preform 10 or a resin container (hereinafter, simply referred to as a container) are arranged at every predetermined angle. The conveyance mechanism 26 moves the transfer plate by 90 degrees to convey the preform 10 (or the container) having the neck portion held by the neck mold 27 to the injection molding unit 21, the temperature adjusting unit 22, the blow molding unit 23, and the taking-out unit 24 in that order. Further, the conveyance mechanism 26 further includes a lifting/lowering mechanism (vertical mold opening/closing mechanism) or a mold opening mechanism of the neck mold 27 and also performs an operation of lifting and lowering the transfer plate and an operation related to mold closing and mold opening (mold release) in the injection molding unit 21 and the like.

(Injection Molding Unit 21)

Figure 2:
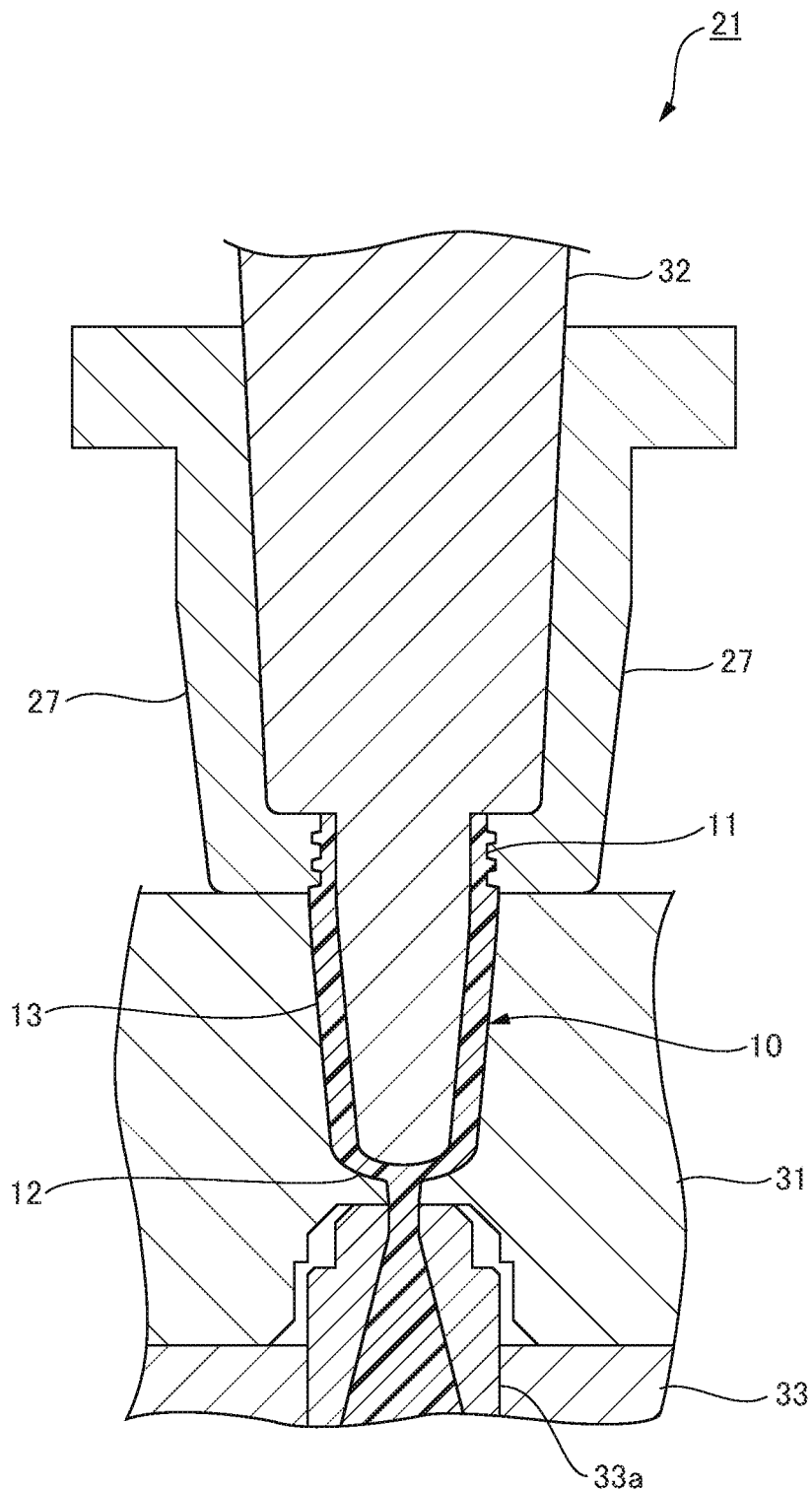
FIG. 2 is a view illustrating a configuration example of an injection molding unit.

As illustrated in FIG. 2, the injection molding unit 21 includes an injection cavity mold 31, an injection core mold 32, and a hot runner mold 33 and manufactures the preform 10 by injection molding. The injection cavity mold 31 and the hot runner mold 33 are fixed to a machine base of the blow molding apparatus 20 in an integrated state. On the other hand, the injection core mold 32 is fixed to a core mold lifting/lowering mechanism (not illustrated). In addition, an injection device 25 that supplies a resin material, which is a raw material of the preform, is connected to the injection molding unit 21.

The injection cavity mold 31 is a mold that defines a shape of an outer periphery of the preform 10. The hot runner mold 33 has a resin supply portion 33a that introduces the resin material into the mold from the injection device 25. In addition, the injection core mold 32 is a mold that defines a shape of an inner peripheral side of the preform 10 and is inserted into an inner peripheral side of the neck mold 27 and the injection cavity mold 31 from above.

In the injection molding unit 21, the injection cavity mold 31, the injection core mold 32, and the neck mold 27 of the conveyance mechanism 26 are closed to form a preform-shaped mold space. Then, the resin material is poured from the injection device 25 into the preform-shaped mold space via the hot runner mold 33, and thereby the preform 10 is manufactured by the injection molding unit 21.

On the other hand, the injection device 25 is a device in which a screw is rotatably and capable of moving forward and backward provided in a barrel cylinder and has a function of heating and melting the resin material and injecting the resin material into molds. The injection device 25 performs injection, pressure holding, and measurement in that order by working of the screw.

The injection device 25 supplies the resin material from a hopper to the cylinder in which the screw is disposed, and performs plasticization kneading and measurement of the resin material by rotation and retraction of the screw (measuring step). Then, the injection device 25 advances the screw at a high speed, thereby, injecting the molten resin into the molds and filling the molds (filling step). Next, the injection device 25 performs additional injection and filling of the molten resin into the molds to compensate for the amount of shrinkage of the molten resin in the molds by advancing the screw at a low speed at a predetermined pressure, and in this state, the pressure is held (pressure holding step). The injection device 25 controls a moving speed (injection speed) of the screw, when the molds are filled with the resin material at a high speed, and controls pressure at the pressure (holding pressure), after the molds are filled with the resin material at a high speed. The switching from the speed control to the pressure control is performed using a screw position or the injection pressure as a threshold. Further, the screw described above may be a plunger.

In addition, as illustrated in FIG. 2, an overall shape of the preform 10 of the embodiment is a bottomed cylindrical shape extending in a longitudinal direction. A tubular neck portion 11 which is open upward is formed on an upper side of the preform 10, and a bottom portion 12 is present on a lower side of the preform 10. In addition, the neck portion 11 and the bottom portion 12 are connected by a body portion 13. Although not particularly limited, a thickness of the body portion 13 of the preform 10 is set to, for example, 2.5 mm to 7.0 mm (preferably 3.0 mm to 5.5 mm).

Further, the above-described shape of the preform 10 is merely an example, and for example, the preform 10 may have a bottomed bowl shape projecting downward.

In addition, a material of the container and the preform 10 is a thermoplastic synthetic resin and can be appropriately selected depending on the use of the container. Specific examples of the material include polyethylene terephthalate (PET), polyethylene naphthalate (PEN), polycyclohexanedimethylene terephthalate (PCTA), Tritan (Tritan (registered trademark): copolyester manufactured by Eastman Chemical Co., Ltd.), polypropylene (PP), polyethylene (PE), polycarbonate (PC), polyethersulfone (PES), polyphenylsulfone (PPSU), polystyrene (PS), a cyclic olefin polymer (COP/COC), polymethyl methacrylate: acrylic (PMMA), polylactic acid (PLA), and the like.

Further, even when the molds of injection molding unit 21 are opened, the neck mold 27 of the conveyance mechanism 26 is not opened, and the preform 10 is held and conveyed as it is. The number of the preforms 10 simultaneously molded by the injection molding unit 21 (that is, the number of containers that can be simultaneously molded by the blow molding apparatus 20) can be appropriately set.

(Temperature Adjusting Unit 22)

The temperature adjusting unit 22 performs temperature equalization and elimination of uneven temperature of the preform 10 manufactured by the injection molding unit 21 and adjusts the temperature of the preform 10 to have a temperature suitable for blow molding (for example, about 90° C. to 105° C.) and a temperature distribution suitable for a container shape to be shaped. In addition, the temperature adjusting unit 22 also has a function of cooling the preform 10 in a high temperature state after injection molding.

Figure 3:
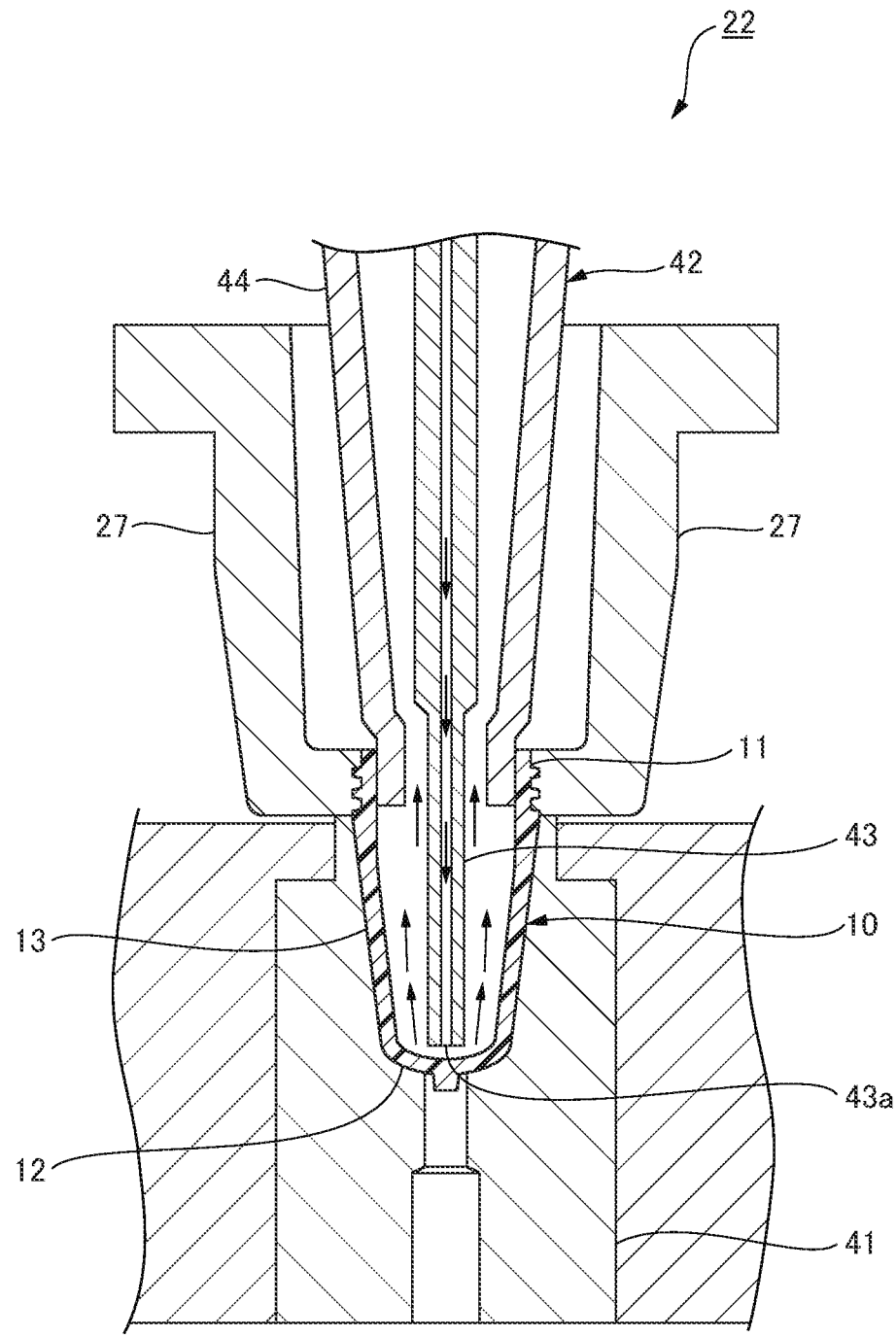
FIG. 3 is a view illustrating a configuration example of a temperature adjusting unit.

FIG. 3 is a view illustrating a configuration example of the temperature adjusting unit 22. The temperature adjusting unit 22 includes a cavity mold (temperature adjusting pot) 41 capable of accommodating the preform and an air introduction member 42 as a mold unit for temperature adjustment.

The cavity mold 41 is a mold having a temperature adjusting space having substantially the same shape as the preform 10 manufactured by the injection molding unit 21. A flow channel (not illustrated), through which a temperature adjusting medium (refrigerant) flows, is formed inside the cavity mold 41. Therefore, a temperature of the cavity mold 41 is maintained at a predetermined temperature by the temperature adjusting medium.

Further, a temperature of the temperature adjusting medium of the cavity mold 41 is not particularly limited but can be appropriately selected within a range of, for example, 5° C. to 80° C., preferably 30° C. to 60° C.

The air introduction member 42 includes an air introduction rod 43 connected to an air supply portion (not illustrated) and a fitting core 44 and is inserted into the neck mold 27 and the preform 10. The air introduction member 42 is airtightly abutted on the neck portion 11 of the preform 10 while inserted into the neck mold 27. The air introduction rod 43 and the fitting core 44 are both hollow cylindrical bodies, and the air introduction rod 43 is concentrically disposed inside the fitting core 44.

An inside of the air introduction rod 43 forms a flow channel through which compressed air (air or a gaseous refrigerant) is introduced from the air supply portion, and a tip of the air introduction rod 43 is inserted to the vicinity of a bottom surface of the preform 10. In addition, an opening 43a for supplying or exhausting compressed air into or from the preform 10 is formed at the tip of the air introduction rod 43 facing the bottom portion of the preform 10.

The fitting core 44 is in close contact with an inner periphery or an upper end surface of the neck portion 11 when the air introduction rod 43 is inserted into the neck mold 27, and the fitting core 44 maintains airtightness with respect to both the preform 10 and the air introduction member 42.

A tip of the fitting core 44 is inserted into or abutted on the position of the neck portion 11 of the preform 10. In addition, an opening 45 for exhausting or supplying air from or into the inside of the preform 10 is formed at the tip of the fitting core 44. In addition, a space between the air introduction rod 43 and the fitting core 44 forms an air exhausting/supplying flow channel connected to an air exhaust portion/air supply portion (not illustrated).

(Blow Molding Unit 23)

The blow molding unit 23 performs stretch blow molding on the preform 10 having the temperature adjusted by the temperature adjusting unit 22 to manufacture a container.

The blow molding unit 23 includes a blow cavity mold which is a pair of split molds corresponding to the shape of the container, a bottom mold, a stretching rod, and an air introduction member (all not illustrated). The blow molding unit 23 performs blow molding on the preform 10, while stretching the preform 10. Consequently, the preform 10 can be shaped into a shape of the blow cavity mold to manufacture a container.

(Taking-Out Unit 24)

The taking-out unit 24 is configured to release a neck portion of the container manufactured by the blow molding unit 23 from the neck mold 27 and unload the container to the outside of the blow molding apparatus 20.

(Control Device 28)

The control device 28 is configured of, for example, a computer such as a programmable logic controller (PLC) and collectively controls operations of the respective units of the blow molding apparatus 20. The control device 28 controls, for example, movement of the transfer plate of the conveyance mechanism 26, opening and closing of the mold of each unit, or the like, thereby, controlling an injection molding operation in the injection molding unit 21, a temperature adjusting operation in the temperature adjusting unit 22, a blow molding operation in the blow molding unit 23, or the like.

In addition, the control device 28 includes a display device and an input device (both not illustrated) as a user interface. The control device 28 receives inputs of various setting values from a user via the input device and controls the operation of each unit based on the inputted setting values. When the setting value is inputted, a setting value input screen is displayed on the display device under the control of the control device 28.

Figure 4:
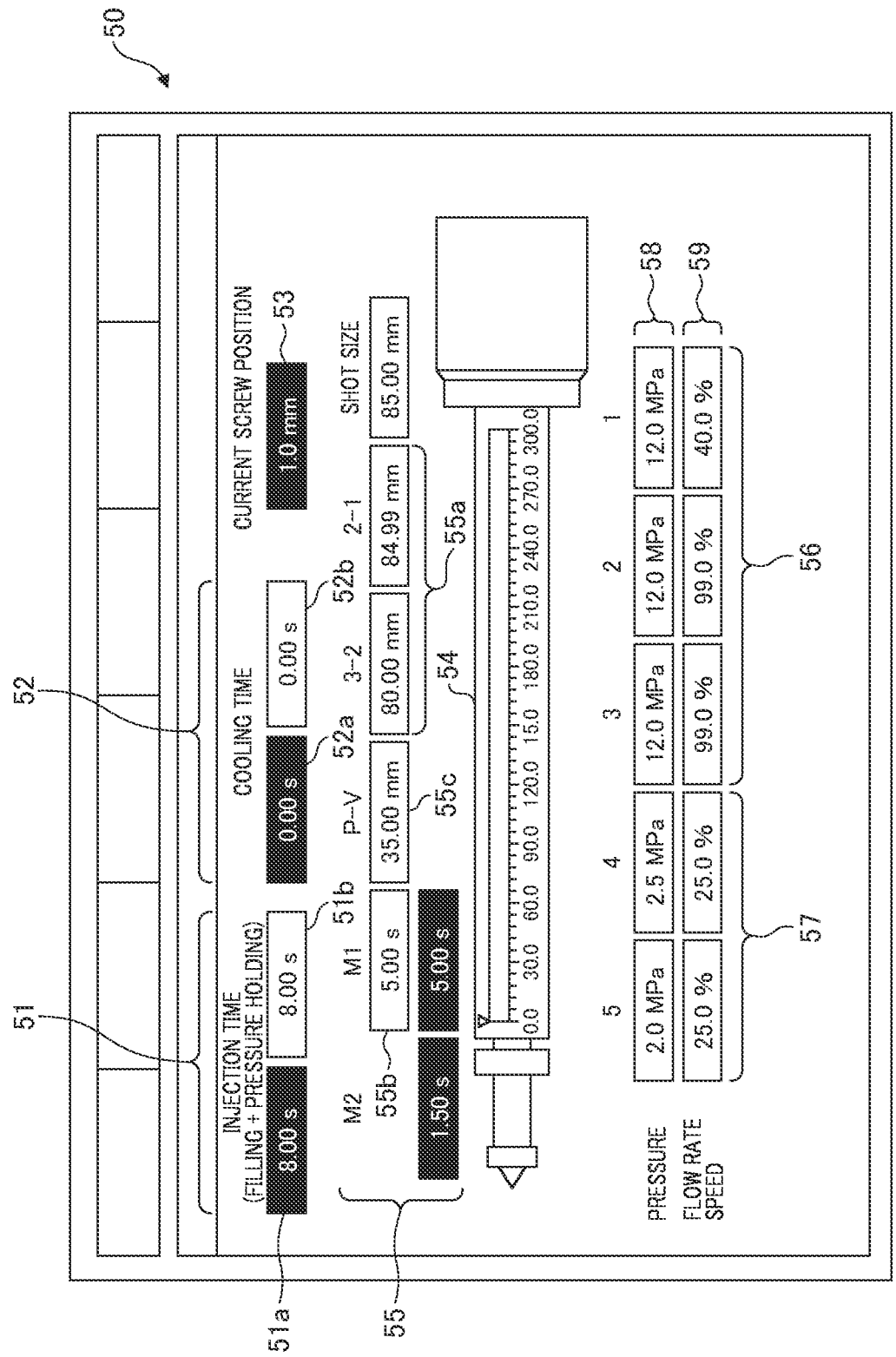
FIG. 4 is a view illustrating an example of a setting value input screen.

FIG. 4 is a view illustrating an example of the setting value input screen.

An input screen 50 illustrated in FIG. 4 is a screen that receives an input of a condition regarding injection of the injection molding unit 21. The input screen 50 has at least a display region 51 of an injection time, a display region 52 of a cooling time, and a display region 53 of a screw position, as display items.

In the display region 51 of the injection time, a setting value 51b of the injection time (filling+pressure holding) in the injection molding unit 21 is inputted, and an actual measurement value 51a and the setting value 51b of the injection time are displayed. In the display region 52 of the cooling time, a setting value 52b of the cooling time in the molds after completion of filling and pressure holding is inputted, and an actual measurement value 52a and the setting value 52b of the cooling time are displayed. In the display region 53 of the screw position, an actual measurement value of a current screw position is displayed. Further, in the embodiment, the setting value 52b of the cooling time is set to 0. In addition, similarly to the setting value 52b, the actual measurement value 52a of the cooling time usually indicates 0.

The input screen 50 further has an indicator 54 indicating the position of the screw of the injection device 25 and a setting display region 55 for setting the position of the screw in each of the filling and pressure holding steps. The setting display region 55 has a setting display region 55a in which a position condition for changing the moving speed of the screw of the injection device 25 is set at the time of the filling step, a setting display region 55b in which a time for advancing the screw of the injection device 25 at a constant pressure and a low speed is set at the time of the pressure holding step, and a setting display region 55c in which a position for switching the operation control of the screw from the speed control to the pressure control is set.

Here, in the setting display region 55a, in the filling step in which the operation of the screw is controlled on a speed basis, a position where the speed is changed is set. In the setting display region 55b, the elapsed time thereof is set in the pressure holding step in which the operation of the screw is controlled on a pressure basis.

In addition, the input screen 50 further has a first display region 56 for setting an operation condition at the time of the filling step of a drive mechanism (hydraulic pump or the like) that operates the screw of the injection device 25, and a second display region 57 for setting an operation condition at the time of the pressure holding step of the drive mechanism (hydraulic pump or the like) that operates the screw of the injection device 25.

An upper row side of the first display region 56 and the second display region 57 indicates a setting value 58 of the pressure on the drive mechanism (hydraulic pump or the like) side corresponding to the pressure of the screw of the injection device 25. The setting value 58 of the pressure is, for example, a discharge pressure of hydraulic oil flowing from a hydraulic pump, a pressure detected by a load cell or the like in an electric motor drive type, or the like. In addition, a lower row side of the first display region 56 and the second display region 57 indicates a setting value 59 of a parameter on the drive mechanism (hydraulic pump or the like) side corresponding to the speed of the screw of the injection device 25. The setting value 59 of the parameter is, for example, a flow rate of the hydraulic oil flowing from the hydraulic pump, a distance detected by an encoder or the like in an electric motor type, or the like.

In the input screen 50 of FIG. 4, the setting value 58 of the pressure and the setting value 59 of the flow rate speed (or the speed of the screw) from the first column to the third column corresponding to the filling step are inputted and displayed in the first display region 56. In addition, in the second display region 57, the setting value 58 of the pressure and the setting value 59 of the speed of the fourth column and the fifth column corresponding to the pressure holding step are inputted and displayed. In addition, in the setting display region 55, setting values of positions for changing the flow rate speed (or the speed of the screw) of the first column and the second column and the second column and the third column corresponding to the filling step are inputted and displayed.

That is, in the order from the right of the input screen 50, the first column illustrates the setting of the filling step of operating the injection device 25 at a pressure of 12.0 Mpa and a flow rate speed (ratio with respect to a flow velocity of the hydraulic oil at a rated time) of 40.0% of rated flow rate speed (when a discharge amount of the hydraulic oil by the hydraulic pump is maximum). In addition, in the second column, the setting of the filling step of operating the injection device 25 at a pressure of 12.0 MPa and a flow rate speed of 99.0% of the rated flow rate speed is illustrated. In addition, in the third column, the setting of the filling step of operating the injection device 25 at a pressure of 12.0 MPa and a flow rate speed of 99.0% of the rated flow rate speed is illustrated. In addition, in the fourth column, the setting of the pressure holding step of operating the injection device 25 at a pressure of 2.5 MPa and a flow rate speed of 25.0% of the rated flow rate speed is illustrated. In addition, in the fifth column, the setting of the pressure holding step of operating the injection device 25 at a pressure of 2.0 MPa and a flow rate speed of 25.0% of the rated flow rate speed is illustrated.

<Description of Blow Molding Method>

Next, a blow molding method performed by the blow molding apparatus 20 of the embodiment will be described.

Figure 5:
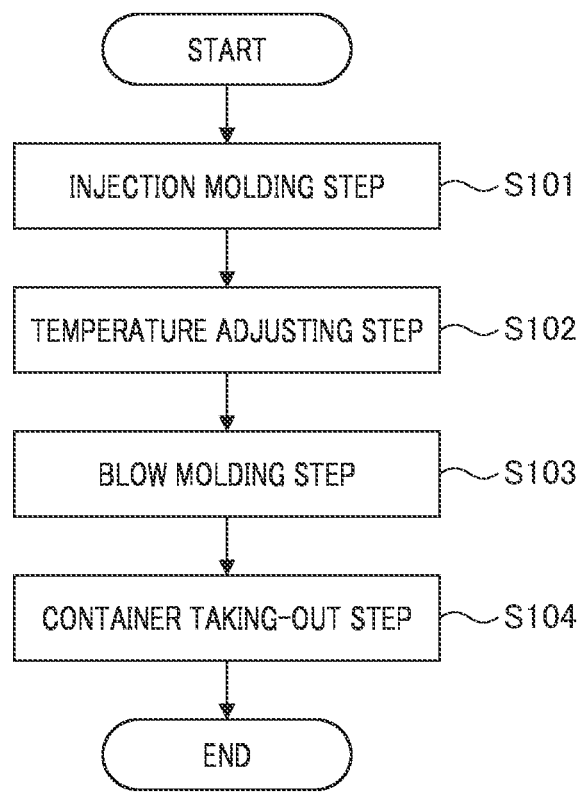
FIG. 5 is a flowchart illustrating steps of a method for manufacturing a container.

FIG. 5 is a flowchart illustrating steps of the blow molding method.

(Step S101: Injection Molding Step)

As illustrated in FIG. 2, in the injection molding unit 21, the resin is injected from the injection device 25 into the preform-shaped mold space formed by the injection cavity mold 31, the injection core mold 32, and the neck mold 27 of the conveyance mechanism 26 to manufacture the preform 10.

Figure 6A:
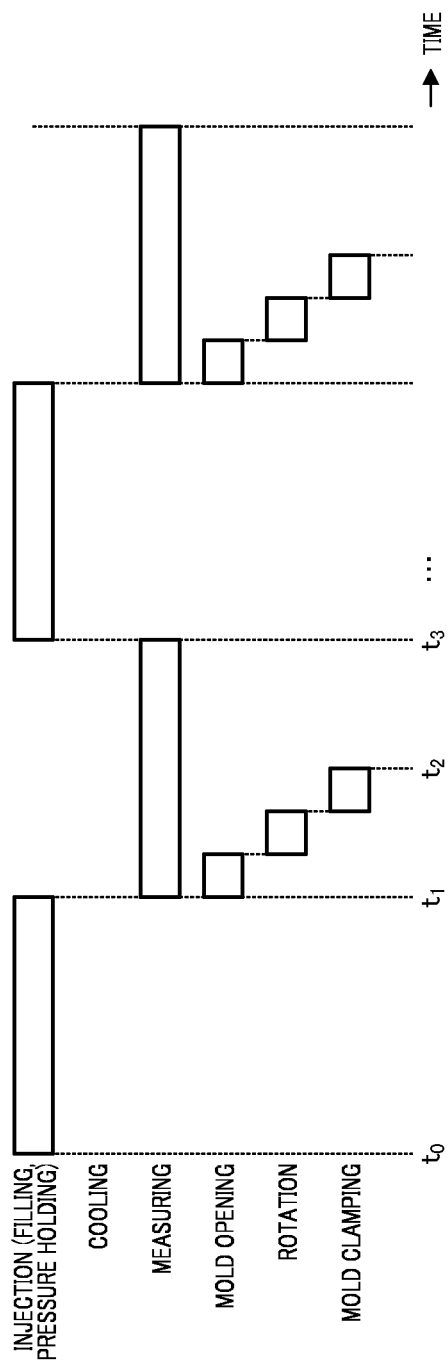
FIGS. 6A and 6B illustrate charts of operation examples of injection molding steps in the embodiment and a comparative example.
Figure 6B:
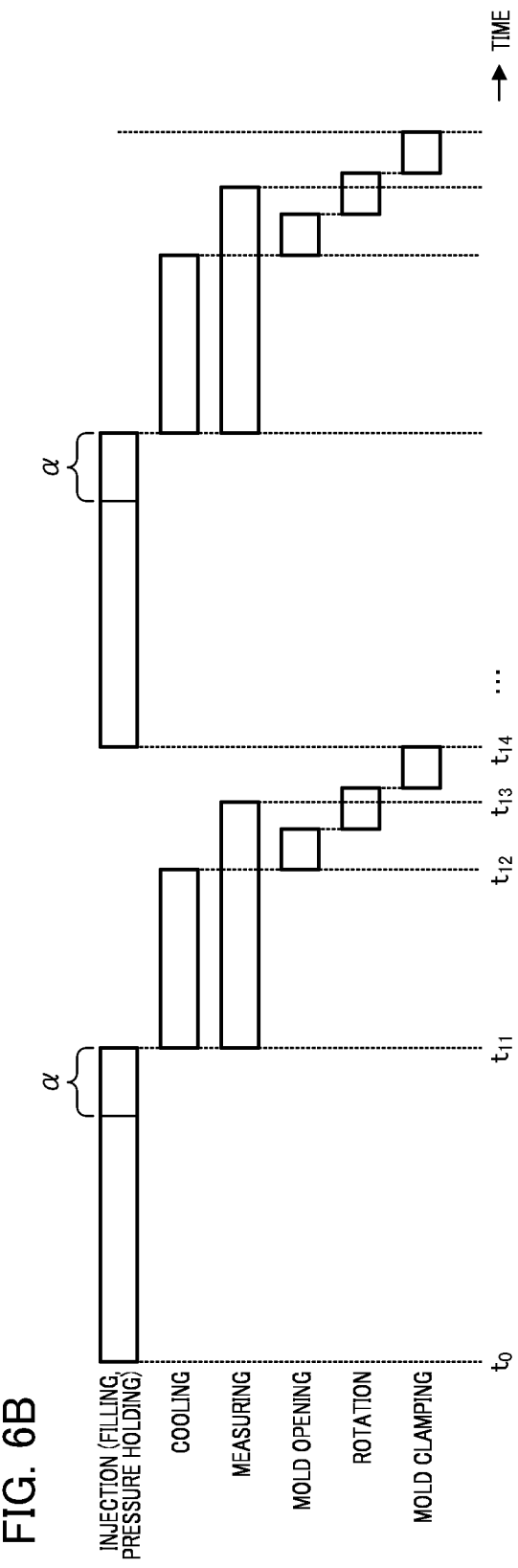

Here, an operation example of the injection molding unit 21 in the embodiment will be described with reference to FIGS. 6A and 6B. FIG. 6A illustrates the operation of the injection molding unit 21 of the embodiment, and FIG. 6B illustrates an operation of an injection molding unit in a comparative example (conventional method) to be described below. Further, the horizontal axis in FIGS. 6A and 6B represents time.

As illustrated in FIG. 6A, in the injection molding unit 21 of the embodiment, injection (filling and pressure holding) of the resin material into the clamped molds is performed in a period from a time point $t_0$ to a time point $t_1$. When the injection (filling and pressure holding) of the resin material is completed at the time point $t_1$, the molds of the injection molding unit 21 are opened without performing a step of cooling the preform 10 in the molds of the injection molding unit 21.

When the molds of the injection molding unit 21 are opened, the preform 10 in a high temperature state is released from the injection cavity mold 31 and the injection core mold 32. Next, the transfer plate of the conveyance mechanism 26 moves to rotate by the predetermined angle, and the preform 10 in the high temperature state which is held by the neck mold 27 is conveyed to the temperature adjusting unit 22. Thereafter, for the subsequent injection molding, the molds of the injection molding unit 21 are closed and then clamped. The above-described operation is performed during the period from the time point $t_1$ to the time point $t_2$ in FIG. 6A.

On the other hand, when the injection of the resin material is completed at the time point $t_1$, the injection device 25 plasticizes and kneads and measures the resin material for the subsequent injection molding. In the example of FIG. 6A, measurement of the injection device 25 is to end at a time point $t_3$.

In the example of FIG. 6A, since the measurement of the injection device 25 is not finished at the time point $t_2$ when the clamping of the molds of the injection molding unit 21 is finished, the subsequent injection molding cannot be started. At the subsequent time point $t_3$, since both the clamping of the molds and the measurement of the injection device 25 have been ended, the subsequent injection molding can be started. Therefore, in the injection molding unit 21, the subsequent injection molding cycle is started from the time point $t_3$.

In addition, in a case where a required time ($t_1$ to $t_3$) for the measurement of the injection device 25 is shorter than a required time ($t_1$ to $t_2$) of a dry cycle including the mold opening, the rotation, and the mold clamping, the measurement is ended earlier than the mold clamping. Therefore, in the above-described case, the subsequent injection molding cycle is started from the completion time point $t_2$ of the mold clamping.

As described above, in the embodiment, after the injection (filling and pressure holding) of the resin material is completed, the subsequent injection molding is started in accordance with a later timing of the end of the dry cycle or the end of the measurement of the injection device 25.

Figure 7:
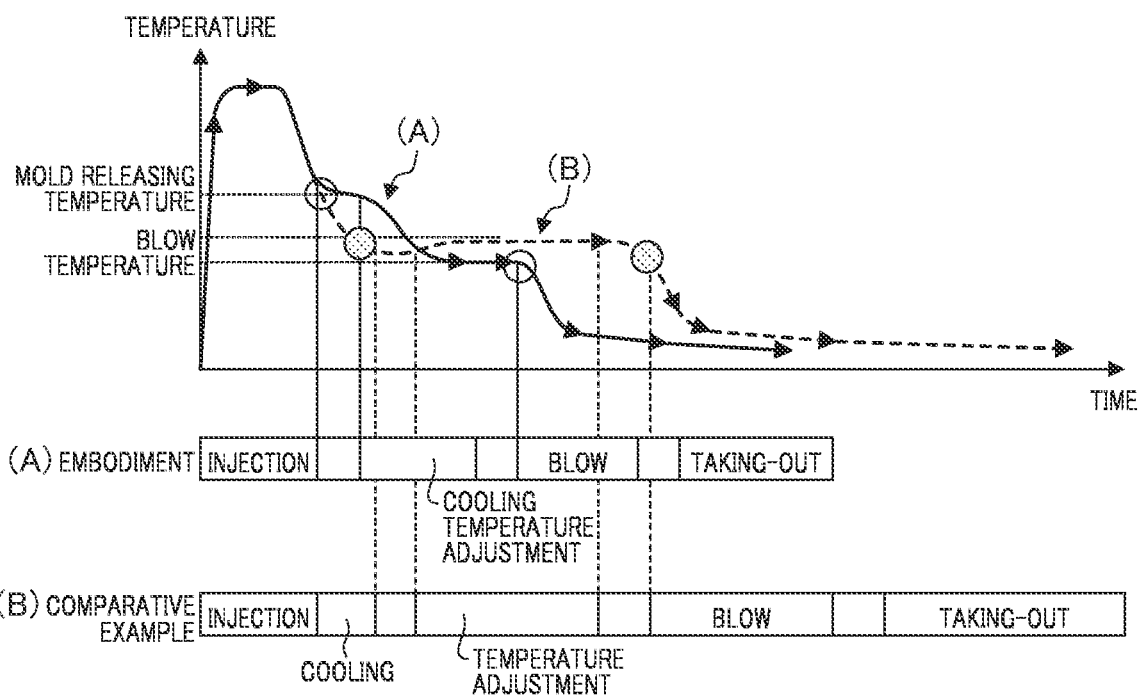
FIG. 7 is a graph illustrating an example of a temperature change of a preform in a blow molding method of the embodiment and the comparative example.

In addition, a temperature change of the preform 10 in the blow-molding method of the embodiment will be described with reference to FIG. 7. The vertical axis of FIG. 7 represents the temperature of the preform 10, and the horizontal axis of FIG. 7 represents time. In FIG. 7, an example of the temperature change of the preform 10 of the embodiment is illustrated in (A) of FIG. 7. In addition, an example of a temperature change of the preform of the comparative example to be described below is illustrated in (B) of FIG. 7. Further, blanks between the respective steps represent a time required for transferring the preform 10 or the container, and all of the blanks have the same length.

In the embodiment, when the resin material is subjected to injection molding at a temperature equal to or higher than the melting point of the resin material, the injection molding unit 21 opens the molds immediately after the completion of filling and pressure holding, and after the completion of filling and pressure holding, the preform 10 is conveyed to the temperature adjusting unit 22 without cooling the preform 10 in the molds. Further, in the screen for setting the injection molding conditions of the preform 10, the cooling time is set to 0. Then, the temperature adjusting unit 22 cools the preform 10 and adjusts the temperature.

In the embodiment, since the preform 10 is not cooled in a state where the pressure holding is not performed in the molds of the injection molding unit 21, sink marks do not appear in the preform 10 in the injection molding unit 21.

In addition, in the embodiment, since the cooling time of the preform 10 is not set, a skin layer (surface layer in a solidified state) of the preform is formed to be thinner than that of the related art, and a core layer (internal layer in a softened or molten state) is formed to be thicker than that of the related art. That is, when compared with the comparative example, the preform 10 having a large thermal gradient between the skin layer and the core layer and having high residual heat at a high temperature is formed.

The preform 10 of the embodiment is released from the injection molding unit 21 at a release temperature higher than that in the comparative example and is conveyed to the temperature adjusting unit 22. With the movement to the temperature adjusting unit 22, the temperature of the preform 10 is equalized by heat exchange (heat conduction) between the skin layer and the core layer. In addition, the preform 10 is slightly cooled from an outer surface by being in contact with external air. However, until the preform 10 is carried into the temperature adjusting unit 22, the temperature of the preform 10 of the embodiment is maintained in a very high state (for example, in a case of PET as a material, a surface temperature of 130° C. or higher), when compared with the comparative example.

(Step S102: Temperature Adjusting Step)

Subsequently, the cooling and the temperature adjustment for causing the temperature of the preform 10 to be close to a temperature (blow temperature) suitable for a final blow are performed by the temperature adjusting unit 22. A blow temperature is set to, for example, 90° C. to 105° C. for a PET resin. Further, when the blow temperature is low, the stretching orientation of the preform 10 is improved, and the strength (physical properties) of the container may be improved. Therefore, for example, the blow temperature may be set to 90° C. to 95° C. for the PET resin.

As illustrated in FIG. 7, in the temperature adjusting unit 22, the temperature of the preform 10 is lowered to the blow temperature, and then the temperature of the preform 10 is maintained at the blow temperature until blow molding is performed. Since the temperature adjusting unit 22 rapidly cools the preform in a high temperature state, whitening (cloudiness) due to spherulite formation crystallization that may occur in a case of slow cooling is also suppressed.

In the temperature adjusting step, as illustrated in FIG. 3, first, the preform 10 is accommodated in the cavity mold 41. Subsequently, the air introduction member 42 is inserted into the neck portion of the preform 10 accommodated in the cavity mold 41. At this time, the neck portion 11 of the preform 10 and the fitting core 44 are brought into close contact with each other to maintain airtightness therebetween.

Thereafter, cooling blow of the preform 10 is performed. In the cooling blow of the preform 10 of the embodiment, for example, compressed air is introduced from the air introduction rod 43 to the bottom portion side of the preform 10, and the compressed air is exhausted from the neck portion side of the preform 10.

In the cooling blow, since the compressed air is ejected from the opening 43a of the air introduction rod 43, the low-temperature compressed air comes into contact with the bottom portion 12 of the preform 10 facing the opening 43a of the air introduction rod 43. The preform 10 is cooled from the inside thereof by the compressed air flowing inside, but the temperature of the compressed air gradually increases toward the body portion 13 and the neck portion 11 through heat exchange with the preform 10. Therefore, in the cooling blow, the bottom portion 12 of the preform 10 is locally cooled significantly, when compared with the neck portion 11 and the body portion 13 of the preform 10. Further, the cooling blow may be performed by ejecting the compressed air from the opening 45 at the tip of the fitting core 44 and exhausting the compressed air from the opening 43a of the air introduction rod 43.

In addition, the preform 10 in the temperature adjusting unit 22 is in continuous contact with the cavity mold 41 maintained at a predetermined temperature by receiving the pressure of the compressed air from the inside. Therefore, in the temperature adjusting step, the temperature of the preform 10 is adjusted not to be equal to or lower than the temperature suitable for blow molding from the outside, and an uneven temperature generated from the injection molding is also reduced. Further, in the temperature adjusting step, the shape of the preform 10 is maintained by the cavity mold 41 and does not greatly change.

After the temperature adjusting step, the transfer plate of the conveyance mechanism 26 moves to rotate by the predetermined angle, and the temperature-adjusted preform 10 held by the neck mold 27 is conveyed to the blow molding unit 23.

(Step S103: Blow Molding Step)

Subsequently, the blow-molding of the container is performed by the blow molding unit 23.

First, the blow cavity mold is closed, the preform 10 is accommodated in the mold space, and the air introduction member (blow core) is lowered, so that the air introduction member abuts on the neck portion of the preform 10. Then, the stretching rod (longitudinal axis stretching member) is lowered to hold the bottom portion of the preform 10 from an inner surface, and blow air is supplied from the air introduction member, while longitudinal stretching is performed as necessary, so that the preform 10 is horizontally stretched. Consequently, the preform 10 is bulged and shaped to be in close contact with the mold space of the blow cavity mold and is blow-molded into the container. Further, the bottom mold stands by at a lower position at which the bottom mold is not in contact with the bottom portion of the preform 10, before the blow cavity mold is closed, and the bottom mold quickly rises to a molding position, before or after the mold is closed.

(Step S104: Container Taking-Out Step)

When the blow molding is finished, the blow cavity mold and the bottom mold are opened. Consequently, the container is movable from the blow molding unit 23.

Subsequently, the transfer plate of the conveyance mechanism 26 moves to rotate by the predetermined angle, and the container is conveyed to the taking-out unit 24. In the taking-out unit 24, the neck portion of the container is released from the neck mold 27, and the container is unloaded to the outside of the blow molding apparatus 20.

Thus, a series of steps of the blow molding method are ended. Thereafter, by moving the transfer plate of the conveyance mechanism 26 to rotate by the predetermined angle, the respective steps of S101 to S104 described above are repeated. During an operation of the blow molding apparatus 20, four sets of containers having a time difference by one step are manufactured in parallel.

Further, due to the structure of the blow molding apparatus 20, the transfer plate is stopped for the same time in each of the injection molding unit 21, the temperature adjusting unit 22, the blow molding unit 23, and the taking-out unit 24. Similarly, the conveyance time of the transfer plate between the units is the same.

Next, with reference to FIGS. 6B and 7, an operation of the injection molding step in the comparative example (conventional method) and the example of temperature change of the preform will be described.

As illustrated in FIG. 6B, in an injection molding unit of the comparative example, injection (filling and pressure holding) of a resin material into a clamped mold is performed in a period from a time point $t_0$ to a time point $t_{11}$. Thereafter, in a period from the time point $t_{11}$ to a time point $t_{12}$, the preform is cooled in the molds without holding pressure. As illustrated in FIG. 7, in the comparative example, the preform is cooled to a temperature substantially equal to or lower than the blow temperature in the molds of the injection molding unit.

When the cooling of the preform is ended at the time point $t_{12}$, the molds of the injection molding unit are opened, and the preform cooled in the molds is released from an injection cavity mold and an injection core mold. Next, a transfer plate of a conveyance mechanism moves to rotate by a predetermined angle, and the preform held by a neck mold is conveyed to a temperature adjusting unit. Thereafter, for the subsequent injection molding, the molds of the injection molding unit are closed and then clamped. The above-described operation is performed during a period from the time point $t_{12}$ to a time point $t_{14}$ in FIG. 6B.

On the other hand, when the injection of the resin material is ended at the time point $t_{11}$, an injection device plasticizes and kneads and measures the resin material for the subsequent injection molding. In FIG. 6B, measurement of the injection device is ended at the time point $t_{13}$ which is a time point between a period of a dry cycle ($t_{12}$ to $t_{14}$). Therefore, in the comparative example illustrated in FIG. 6B, the subsequent injection molding cycle is started from the time point $t_{14}$.

In the comparative example, the preform is cooled in the molds of the injection molding unit. Therefore, in the comparative example, one cycle of the injection molding step is longer than that in the embodiment by the cooling time ($t_{11}$ to $t_{12}$).

In addition, in the comparative example, since the preform is cooled in a state where the pressure holding is not performed in the molds of the injection molding unit, shrinkage of the preform is promoted during cooling, and the preform is likely to have sink marks. In a case of suppressing sink marks in the preform in the comparative example, a longer injection (filling and pressure holding) time has to be secured than in the embodiment, and one cycle of the injection molding step becomes longer than in the embodiment. In FIG. 6B, an extra time for suppression of the sink marks in an injection time is indicated by Reference sign α.

As an example, the times required for one cycle of the injection molding step in the embodiment and the comparative example are both illustrated. Here, a thickness of the body portion of the preform is 4.0 mm, the injection (filling and pressure holding) time is 8 seconds, the cooling time is 6.5 seconds, the measurement time is 8 seconds, and the dry cycle time is 4 seconds.

Under the above-described conditions, one cycle of the injection molding step in the embodiment is 16 seconds (8+8). Since a machine operation in the embodiment is performed during the measurement time, the time for the dry cycle in the embodiment can be assumed to be zero. On the other hand, one cycle of the injection molding step in the comparative example is 18.5 seconds (8+6.5+4). However, in the case of the above-described comparative example, sink marks are produced due to the cooling in the molds. Therefore, when the injection time is extended to suppress sink marks, the time required for the injection molding step of the comparative example is further extended and is actually longer than 18.5 seconds (for example, 20 seconds or longer).

Further, in each step of the hot parison blow molding, the required time is set in accordance with the injection molding step which is a rate-determining phase, and in a sequence of cycles of the hot parison blow molding, the time difference from the comparative example is integrated by the number of steps. Therefore, according to the embodiment, one cycle of the blow molding turns out to be significantly shortened, when compared with the comparative example.

In addition, according to the embodiment, when the injection time and the measurement time are substantially equal, and the injection time and the measurement time are shorter than the time of the dry cycle (injection time measurement time<dry cycle), the time of the molding cycle can be significantly shortened, when compared with the comparative example (conventional method). For example, when the injection time and the measurement time are 3.5 seconds, and the time of the dry cycle is 4 seconds, the time of the molding cycle (one cycle including blow molding) is 7.5 seconds. In addition, when the measurement time is equal to or shorter than the time of the dry cycle (measurement time<dry cycle), the time of the molding cycle can be shortened, when compared with the comparative example (conventional method). For example, when the injection time is 5 seconds, the measurement time is 4 seconds, and the time of the dry cycle is 4 seconds, the time of the molding cycle is 9 seconds. Moreover, since the pressure holding step is not performed, the material consumption can be reduced, and the weight of the preform 10 and the container can be reduced. As an example, in the embodiment, weight reduction of about 2 to 5% can be realized, when compared with the preform having the same size when the pressure holding is performed.

Hereinafter, operational effects of the embodiments will be described.

In the injection molding step (S101) of the embodiment, the injection cavity mold 31 and the injection core mold 32 are opened after the completion of filling and pressure holding of the resin material, and the preform 10 is taken out without being cooled in the molds after the completion of filling and pressure holding.

In the embodiment, since the preform 10 is not cooled in a state where the pressure holding is not performed in the molds of the injection molding unit 21, it is possible to suppress an event in which the preform 10 shrinks in the injection molding unit 21 to cause sink marks.

In addition, in the embodiment, there is no cooling time for cooling the preform 10 in the molds in a state where the pressure holding is not performed in the injection molding step, and the injection molding time, which is the rate-determining phase, can be shortened, so that the container can be manufactured in a high-speed molding cycle.

In addition, in the embodiment, in the temperature adjusting step (S102), the cooling blow for introducing the compressed air into the preform 10 to cool the preform 10 is performed. Since the cooling of the preform 10 can be performed sufficiently by the cooling blow of the temperature adjusting unit 22, insufficient cooling of the preform 10 does not happen.

The preform 10 carried into the temperature adjusting unit 22 without being cooled in the molds has a very high temperature, and when slowly cooled, whitening due to crystallization, a shape change (drawdown) of the preform 10, or the like may occur. However, in the embodiment, since the preform 10 is rapidly cooled by the temperature adjusting unit 22 by the cooling blow using the compressed air, the blow molding can be performed on the preform 10 without whitening.

In addition, in the embodiment, there is no need to reheat the preform having a temperature equal to or lower than the blow temperature by the temperature adjusting unit 22 as in the comparative example. Therefore, the temperature of the preform is efficiently adjusted, and a process of the blow molding can be further simplified.

Further, for example, in a case of applying a bowl-shaped preform, the bottom portion has been molded to be considerably thin with a thickness ratio of 0.5 of the bottom portion to the body portion in the related art. In the embodiment, the thickness ratio of the bottom portion to the body portion can be increased to 0.85 by an effect of the cooling blow of the temperature adjusting unit 22. Consequently, the flow resistance of the resin in the vicinity of a gate of the bottom portion decreases, and the shear heating decreases, so that whitening of the preform in the vicinity of the gate of the bottom portion is easily suppressed.

The present invention is not limited to the above-described embodiments, and various improvements and design changes may be made without departing from the gist of the present invention.

In the above-described embodiments, a configuration of a hot parison four-station type device has been described as an example of the blow molding apparatus. However, the blow molding apparatus of the present invention is not limited to the above-described embodiments and may be applied to a blow molding apparatus other than the four-station type, as long as the blow molding apparatus includes an injection molding unit, a temperature adjusting unit, and a blow molding unit.

In addition, the embodiments disclosed herein are to be considered in all respects as illustrative and not restrictive. The scope of the present invention is indicated not by the above description but by the claims and is intended to include meanings equivalent to the claims and all modifications within the scope.

The invention claimed is:

1. A method for manufacturing a resin container, comprising:
   performing injection molding of a resin preform;
   adjusting a temperature of the preform manufactured in the performing injection molding; and
   performing blow molding on the temperature-adjusted preform to manufacture the resin container,
   wherein, in the performing injection molding, injection molds are opened after completion of filling and pressure holding of a resin material, and the preform is taken out without being cooled in the injection molds after the completion of filling and pressure holding, and
   in the adjusting the temperature, a refrigerant is introduced into the preform to cool the preform.

2. The method for manufacturing a resin container according to claim 1,
   wherein subsequent injection molding is performed at a later timing of completion of measurement of the resin material or completion of clamping of the injection molds after the completion of filling and pressure holding of the resin material.

3. The method for manufacturing a resin container according to claim 1,
   wherein, in the adjusting the temperature, a bottom portion of the preform is cooled more significantly than other portions of the preform.

4. The method for manufacturing a resin container according to claim 1,
   wherein, in the adjusting the temperature, the preform is accommodated in a cavity mold, and the preform is brought into close contact with the cavity mold by pressure of the refrigerant to cool the preform.

* * * * *